Patented July 2, 1946

2,403,166

UNITED STATES PATENT OFFICE 2,403,166

PLASTIC PACKING

Herman E. Ballard, Berkeley, Calif.

No Drawing. Application March 1, 1941,
Serial No. 381,410

4 Claims. (Cl. 260—23)

This invention relates to packing materials and more particularly to plastic packings for high temperature and high pressure services.

In my copending application S. N. 381,411, filed of even date herewith, I have disclosed a lubricating and sealing composition for valves and the like controlling the flow of fluids under high temperatures and pressures. The composition so disclosed comprises particles of synthetic elastic materials among which the butadiene copolymers and chloroprene polymers are specifically mentioned. The butadiene copolymer particles are valuable for the purposes described by reason of their ability to swell at high temperatures and absorb considerable amounts of mineral oil line fluid. However, in so doing, the particles lose their tensile strength and would thus be rendered unsuitable for use as a packing composition such as contemplated herein.

Particles of the chloroprene polymers will retain their tensile strength in mineral oils and can be used to seal valve and pump glands handling such oils. The seal is adequate under all pressures which may be applied thereto up to the extreme range of 18,000 pounds per square inch. Moreover, elevated temperatures in the neighborhood of 300° F. do not appear to affect the material adversely in regard to its sealing properties.

A suitable composition is made as follows:

Mix together at approximately 300° F. about 18.75 per cent white petrolatum and about 6.25 per cent aluminum stearate and allow the mixture to cool to room temperature. Introduce into this mixture about 75% of particles of a chloroprene polymer of the type marketed as "neoprene" comminuted by grinding or other suitable means. Satisfactory mixing of the chloroprene polymer particles and the other ingredients may be achieved by the ordinary mortar and pestle.

The plastic composition thus made may be used to seal valve or pump glands or in other locations where known types of packing have heretofore been employed. The elastic particles of chloroprene polymer are suspended in a gel of aluminum stearate and petrolatum which does not lower their tensile strength yet lubricates them so that they "flow" over one another when pressure is applied as by the packing gland or by the liquid being handled. Apparently while the composition will flow under relatively low pressure through the ordinary filling apertures of glands and the like, the particles interlock under higher pressures when attempt is made to force them through openings of less than their average dimensions.

Under test, this composition was easily forced through the filling inlet of a valve stuffing box, which inlet was of one quarter inch diameter and provided with a ball check valve therein. When, however, attempt was made to force it past the braided asbestos packing rings, which are customarily employed in such devices for packing the valve stem, no visible leakage could be discovered under pressure as high as 18,000 pounds per square inch. The composition appears to remain plastic, but when sufficient pressure is applied, the individual particles interlock and act, not as particles, but as a solid. This pressure is such as to cause distortion of the particles, but there is no setting or welding effect, and no impairment of the elasticity of the particles due to the tensile strength of the material.

As the function of the perolatum and aluminum stearate is to bind the elastic particles together and lubricate them without affecting their tensile strength, it is apparent that other substances will meet these requirements. A mineral oil made plastic with soaps or hard asphalt or mineral wax, or animal and vegetable waxes would suffice. The aluminum stearate can be replaced by calcium stearate or other soaps, either water soluble or insoluble, as long as the tensile strength of the particles is maintained substantially unimpaired. A mineral oil made plastic by dissolving therein about 50 per cent hard mineral wax would be suitable to receive the particles. The final composition of such an alternative would be about 12.5 per cent mineral oil, about 12.5 per cent mineral wax and about 75 per cent comminuted chloroprene polymer. Ordinarily, about 25% of the carrying medium is desirable but is subject to variation depending upon the size of the particles. As a general rule the smaller the particle the larger the quantity of binder necessary.

I claim:

1. A plastic composition consisting of about 75 per cent comminuted chloroprene polymer, 18.75 per cent petrolatum and 6.25 per cent aluminum stearate.

2. A plastic composition consisting of about 75 per cent comminuted chloroprene polymer, 12.5 per cent mineral oil, and 12.5 per cent mineral wax.

3. A plastic packing consisting of about 75% minute discrete particles of chloroprene polymer suspended in a gel binder which does not lower the tensile strength of said particles.

4. A plastic packing consisting of about 75% minute discrete particles of chloroprene polymer suspended in a gel binder comprising mineral oil and a plasticizing agent.

HERMAN E. BALLARD.